(12) United States Patent
Dingeldein et al.

(10) Patent No.: US 6,273,244 B1
(45) Date of Patent: Aug. 14, 2001

(54) IDLER PULLEY FOR A CONVEYOR ASSEMBLY

(75) Inventors: Mark S. Dingeldein, Milford; Stephen M. Ginter, Warsaw, both of IN (US)

(73) Assignee: CTB, Inc., Milford, IN (US)

( * ) Notice: Subject to any disclaimer, the term of this patent is extended or adjusted under 35 U.S.C. 154(b) by 0 days.

(21) Appl. No.: 09/099,971

(22) Filed: Jun. 19, 1998

(51) Int. Cl.⁷ .................................................. B65G 15/08
(52) U.S. Cl. .......................................................... 198/824
(58) Field of Search .................... 198/824, 812, 198/808

(56) References Cited

U.S. PATENT DOCUMENTS

| | | | |
|---|---|---|---|
| 373,389 | * 11/1887 | Creager . | |
| 857,370 | * 6/1907 | Waechter | 198/808 |
| 968,211 | * 8/1910 | Vrooman . | |
| 1,636,051 | * 7/1927 | Francisco . | |
| 1,707,998 | * 4/1929 | Shaw . | |
| 2,542,885 | * 2/1951 | Troyer | 198/233 |
| 2,688,394 | * 9/1954 | Hurd et al. . | |
| 2,815,851 | * 12/1957 | Yoshimura . | |
| 3,221,868 | * 12/1965 | Ricker . | |
| 3,680,681 | * 8/1972 | Burk | 198/349 |
| 4,011,938 | * 3/1977 | Kain | 198/824 |
| 4,101,019 | * 7/1978 | Satterwhite | 198/300 |
| 4,230,222 | * 10/1980 | Clark | 198/580 |
| 4,234,078 | * 11/1980 | Nott | 198/833 |
| 4,301,109 | * 11/1981 | Kain | 264/219 |
| 4,621,728 | * 11/1986 | Kain | 198/827 |
| 4,986,412 | * 1/1991 | Brais . | |
| 5,025,917 | * 6/1991 | Smith et al. | 198/842 |
| 5,350,053 | * 9/1994 | Archer | 198/525 |
| 5,379,878 | * 1/1995 | Rohde | 198/366 |
| 5,655,642 | * 8/1997 | Lawrence et al. | 193/37 |
| 5,669,562 | * 9/1997 | Smith | 241/101.74 |
| 5,685,416 | * 11/1997 | Bonnet | 198/812 |
| 6,102,195 | * 8/2000 | Weikel | 198/808 |

FOREIGN PATENT DOCUMENTS

| | | | |
|---|---|---|---|
| 710936 | * 10/1902 | (WO) . | |
| 4146947 | * 4/1979 | (WO) | 26/101 |

* cited by examiner

Primary Examiner—Christopher P. Ellis
Assistant Examiner—Khoi H. Tran

(57) ABSTRACT

An idler pulley for use in supporting a conveyor belt in a conveyor assembly includes a central body portion, a first angled end portion extending from the central body portion and a second angled end portion extending from the central body portion. The first angled end portion includes a first outer end face and the second angled portion includes a second outer end face. A shaft is rotatably supported at a first location and extends into the first angled end portion. A first positive balanced connection is located between the first outer end face and the shaft such that the first positive balance connection is substantially adjacent to the first location to substantially reduce shaft deflection and provide a substantially balanced connection.

9 Claims, 4 Drawing Sheets

IDLER PULLEY FOR A CONVEYOR ASSEMBLY

BACKGROUND OF THE INVENTION

1. Field of the Invention

This invention relates generally to conveyor assemblies and, more particularly, to an idler pulley for use in a grain conveyor assembly.

2. Discussion of the Related Art

In various industries, such as those involving agriculture, manufacturing, commercial, and industrial applications it is often necessary to store and transport relatively large amounts of granular materials. In agriculture, for example, it is often necessary to store and transfer substantial quantities of grain from one location to another location. In such instances, grain conveyor assemblies are generally used to move the granular material or grain to and from storage silos or elevators at a first location to grain transportation vehicles at a second location, such as conveyors, grain transport barges, freight trains, trucks, etc.

Grain conveyor assemblies or belt conveyors generally employ a continuous conveyor belt that carries the grain on an upper surface of the conveyor belt. This continuous belt typically rides atop a set of rollers or pulleys. These pulleys include end pulleys which are used for driving the belt and intermediate pulleys which have a V-shaped contour to retain and transport the grain, via the belt. The intermediate pulleys are generally known in the art as idler pulleys because they are intermediate pulleys located between the end pulleys and are not directly driven by a drive mechanism and simply rotate under contact with the conveyor belt. Idler pulleys generally include a central cylindrical portion and opposed conically shaped or angled end portions in order to create the V-shaped contour in the conveyor belt.

Some examples of conventional idler pulleys include the idler pulley disclosed in U.S. Pat. No. 4,230,222 to Clark, which discloses a pair of parabolic shaped or angled end portions and an attached central portion to form the idler pulley. In this configuration, a pair of roller shafts are fixedly secured to the parabolic shaped end portions, via set screws that pass through a central mounting tube in which the shafts slidably engage. Inbound from the open end faces of the parabolic shaped end portions are cross spokes having a washer like ring that is secured to the mounting tube and substantially supports and transfers the load upon the roller shafts.

Another conventional idler pulley used for grain conveyor assemblies is the "Hawk" idler pulley provided by the RGF Company of Potosi, Wis. This idler pulley includes a central cylindrical portion having annular end disks which are welded to the roller shaft. Extending out from and coupled to the end disks are hollow conically shaped end portions, such that the annular end disks which are welded to the shaft are located inbound relative to the outer end faces of the conically shaped end portions.

Each of the above identified idler pulleys support a conveyor belt for retaining and transporting grain. However, each of these idler pulleys suffer from many disadvantages. For example, in the RGF idler pulley, since the roller shaft is welded to the end disks which are inbound relative to the outer end faces of the conically shaped end portions, a large shaft deflection is created by the moment arm between the bearings at the end of the shaft and the attachment of the shaft to the annular end disks. Such shaft deflection over time creates fatigue in this weld region which may cause stress fractures and potential catastrophic failure of the roller shaft. Moreover, by welding the shaft to the end disks within the idler pulley, this further causes additional stresses in this region, as well as eliminates the option of removing the shaft for maintenance or replacement purposes. Tolerance effects from the welding also creates an unbalanced and non-concentric pulley assembly.

With regard to the Clark idler pulley, the location of attachment of the shaft to the pulley is also located inbound of the end faces of the pulley, thereby also causing shaft deflection. Moreover, by utilizing set screws to secure the shafts relative to the pulley, the shaft is not substantially concentric with the rest of the pulley and a substantially unbalanced idler pulley assembly is formed. This unbalanced assembly causes vibration throughout the system. Another disadvantage with the use of set screws is that if the bearings in which the shaft rides on ever fail, there is the potential for the shaft to be forcibly rotated relative to the set screws, thereby generating extreme heat and a possible flash point for combustion of the grain dust.

Still further, in each of these designs, the end faces of the conical or parabolic shaped portions are fully open to exposure or include open spokes. This enables these areas to accumulate dust and debris, while the spokes further generate air turbulence, thereby causing or creating additional grain dust. In addition, these designs do not address the additional forces applied to the conveyor assemblies at the grain inlet portion, thereby inducing addition stresses into the system. Finally, neither of the pulleys address the speed differential associated between the cylindrical center portion of the pulleys and the conical or parabolic shaped portions of the pulleys, whereby increased friction is generated at the conical or parabolic shaped portion since this portion generally exhibits a higher velocity or speed as you move farther away from the rotating center axis. This, in turn, increases the wear on the conveyor belt, as well as induces an additional load on the drive mechanism.

What is needed then is an improved idler pulley for use in a grain and material handling conveyor assemblies which does not suffer from the above mentioned disadvantages. This will, in turn, substantially reduce shaft deflection; substantially reduce overall stress within the shaft; provide a positive balanced connection between the shaft and the pulley; provide a substantially concentric design which is easily manufactured and assembled in order to reduce overall vibration and create a more balanced design; reduce or eliminate the generation of air turbulence as the pulley rotates, thereby reducing grain or related dust; provide an idler pulley that may be readily and easily maintained over time; provide a secure positive balanced connection to the shaft which reduces possible flash points or points of extreme heat; and reduce overall friction, heat, drag and wear on the conveyor belt due to speed or velocity variances relative to the cylindrical and conical shaped portions of the pulley. It is, therefore, an object of the present invention to provide such an idler pulley for a grain conveyor assembly.

SUMMARY OF THE INVENTION

In accordance with the teachings of the present invention, an idler pulley for use in supporting a conveyor belt in a conveyor assembly is disclosed. This idler pulley substantially reduces shaft deflection, air turbulence, and provides a substantially overall balanced idler pulley to reduce vibration throughout the conveyor assembly. This idler pulley further reduces frictional forces to the conveyor belt which rides upon the idler pulley.

In one preferred embodiment, an idler pulley for use in supporting a conveyor belt in a conveyor assembly includes a central body portion, a first angled end portion extending from the central body portion and a second angled end portion extending from the central body portion. The first angled end portion includes a first outer end face and the second end portion includes a second outer end face. A shaft rotatably supported at a first location extends into the first angled end portion. A first positive balanced connection is positioned between the first outer end face and the shaft such that the first positive balanced connection is substantially adjacent to the first location to substantially reduce the shaft deflection and provide a substantially balanced connection.

In another preferred embodiment, an idler pulley for use in supporting a conveyor belt in a conveyor assembly includes a central body portion upon which the conveyor belt rides. A first angled end portion is adjacent the conveyor body portion and a second angled end portion is also adjacent the central body portion. A shaft extends through the central body portion, the first angled end portion and the second angled end portion such that the central body portion may independently rotate relative to the first angled end portion and the second angled end portion. This substantially reduces the overall frictional force between the idler pulley and the conveyor belt.

In yet another preferred embodiment, a conveyor assembly for transporting granular material from a first location to a second location includes a head section, a tail section and an intermediate inlet section. The head section includes a head pulley which is operable to drive a conveyor belt along the conveyor assembly. The tail section includes a tail pulley upon which the conveyor belt rotates. The intermediate inlet section includes at least three idler pulleys located along an inlet duct such that the three idler pulleys are operable to substantially dissipate a force generated by the granular material flowing upon the conveyor belt.

Use of the present invention provides an idler pulley for use in supporting a conveyor belt in a conveyor assembly. As a result, the aforementioned disadvantages associated with the prior art idler pulleys and conveyor assemblies have been substantially eliminated.

BRIEF DESCRIPTION OF THE DRAWINGS

Still other advantages of the present invention will become apparent to those skilled in the art after reading the following specification and by reference to the drawings in which:

FIG. 3 is an enlarged partial cross-sectional view taken about line 3 of FIG. 2 showing the bushing and hub assembly of the idler pulley of FIG. 2;

DETAILED DESCRIPTION OF THE PREFERRED EMBODIMENT(S)

The following description of the preferred embodiments concerning an idler pulley for use in a grain conveyor assembly are merely exemplary in nature and are not intended to limit the invention or its application or uses. Moreover, while the present invention is described in detail below with reference to grain conveyor assemblies, the present invention is clearly not limited to only grain conveyor assemblies and may include any type of conveyor assembly to transport any type of granular material. In addition, it should be understood that the use of the term "pulley" includes and may be interchanged with the term "roller".

Figure 1:
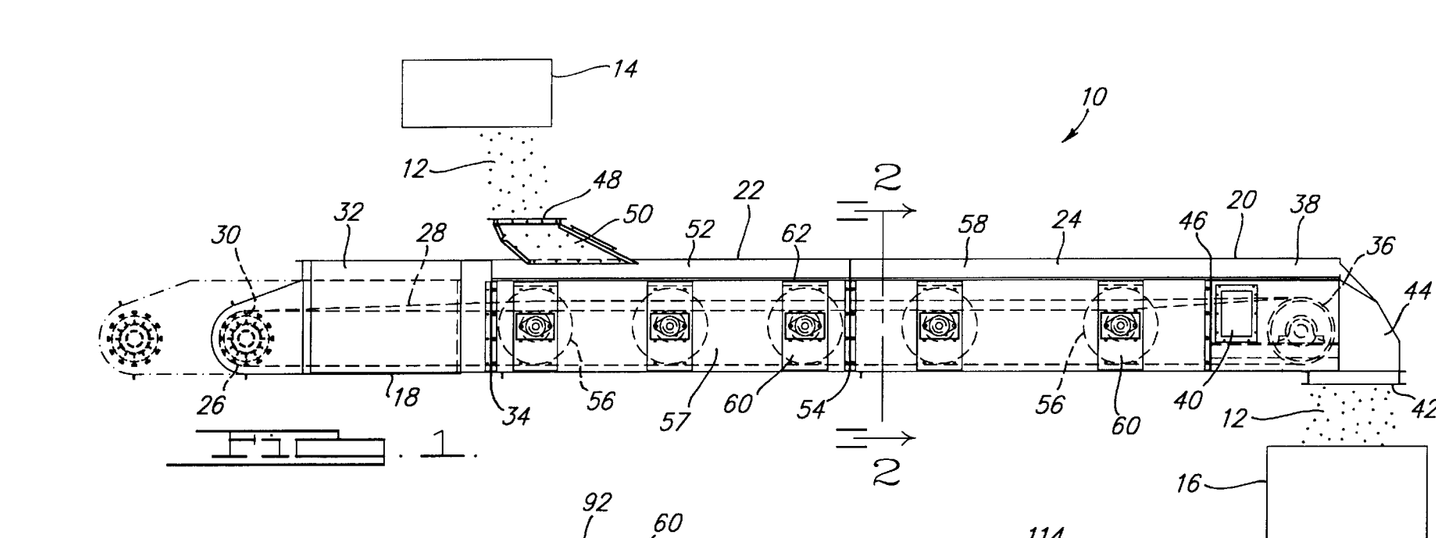
FIG. 1 is a side elevational view of a grain conveyor assembly delivering granular material from a first location to a second location according to the teachings of the present invention.

Referring to FIG. 1, a grain conveyor assembly 10 for transporting granular material or grain 12 from a first location 14 to a second location 16 is shown. The grain conveyor assembly 10 includes a telescopic tail section 18, a head section 20, an intermediate inlet section 22 and an intermediate section 24. It should be noted that while a single intermediate inlet section 22 and a single intermediate section 24 are shown in FIG. 1, those skilled in the art would appreciate that depending on the particular configuration desired, multiple intermediate sections 24 may be included to lengthen the conveyor assembly 10, as well as additional intermediate inlet sections 22 may also be added at various locations to provide for multiple inlets. Moreover, in longer conveyor assemblies which are over about two-hundred feet (200') in length, a gravity take-up tail section may be employed.

The telescopic tail section 18 is a conventional telescopic tail section as is known in the grain conveyor art and is preferably a "Brock Hawk" type telescopic tail section available from Chore-Time Brock of Milford, Ind. The telescopic tail section 18 includes a winged tail pulley 26 in which a conveyor belt 28 rides upon. The winged tail pulley 26 includes a reloading feature which is well known in the art that is capable of reloading any grain which may be displaced from the conveyor belt 28, via paddles 30 located about the circumference of the tail pulley 26. The telescopic tail section 18 is substantially housed within a sealed outer housing 32, thereby protecting the grain 12 being transported on the conveyor belt 28 from the environment. The winged tail pulley 26 is operable to be telescopically adjusted between the range of about 0 to about thirty inches (30") along the longitudinal axis of the conveyor assembly 10 using conventional telescopic adjustment techniques, thereby enabling tension adjustment on the conveyor belt 28. The overall length of the telescopic tail section is about six feet-three inches (6"–3") and may be separated from the intermediate inlet section 22 along an abutting joint or seam 34.

The head section 20 is used for driving the conveyor belt 28 along the conveyor assembly 10, via a head pulley 36. Here again, the head section 20 is a conventional head section for a grain conveyor assembly and is preferably a "Brock Hawk" head section also available from Chore-Time Brock of Milford, Ind. The head pulley 36 is driven by a High Torque Drive (HTD) which includes a reduction gear box in communication with the head pulley 36, via a belt drive. The head pulley 36 is substantially cylindrical in shape, such that the conveyor belt 28 is driven along a substantially planar surface. The structure of the head section 20 includes a sealed housing 38 having an access panel 40 and a discharge outlet 42 extending from a discharge chute 44. As the head pulley 36 is rotated clockwise at a speed between about 0–200 revolutions per minute (RPM), up to about 60,000 BU/HR (bushels per hour) of grain 12 is delivered from the discharge chute 44 at the discharge outlet 42 to the second location 16. The second location 16 may be a grain barge, freight train, grain hauling trucks, or any other type of grain hauling vehicle. Alternatively, the second location 16 may also be an additional grain conveyor assembly or other storage facilities, such as a grain elevator. The head section 20 is about four feet (4') in length and is joined to the intermediate section 24, via an abutting joint or seam 46.

The intermediate inlet section 22 is operable to receive the grain 12 from the first location 14, via an inlet opening 48 of an inlet duct 50. Here again, the first location 14 will generally be a grain storage facility such as a grain elevator or grain silo or other storage facilities for fertilizer, seed, etc. However, the first location 14 may also be a grain hauling vehicle as noted with respect to the second location 16, as well as an additional conveyor assembly. The inlet duct 50 is coupled to a sealed housing 52 which houses the intermediate inlet section 22. The intermediate inlet section 22 is coupled to the telescopic tail section 18, via the abutting joint 34 and to the intermediate section 24, via an abutting joint 54. The intermediate inlet section 22 is about eight feet (8') in length and includes at least three idler pulleys 56 of the present invention, spaced about three feet (3') apart from one another along the sealed housing 52. The use of three idler pulleys 56 positioned in relative close proximity to one another (i.e. approximately three feet apart) in the single intermediate inlet section 22 provides additional support for the weight and force of the grain 12 upon the conveyor belt 28, as the grain 12 drops onto the conveyor belt 28, via the inlet duct 50, which exhibits any increased force due to impact created from loading. This substantially evenly dissipates the force generated by the granular material 12 flowing upon the conveyor belt 28. It should be noted that conventional intermediate sections with existing grain conveyor assemblies do not provide a concentrated area of idler pulleys at their inlet portions, thereby providing additional stress and potential failure of the idler pulleys utilized in these areas.

The intermediate section 24 is coupled to the intermediate inlet section 22, via the abutting joint 54 and coupled to the head section 20, via the abutting joint 46. Here again, the intermediate section 24 includes an enclosed housing 58 to protect the grain from the environment and the environment from dust and dirt as the grain 12 is transported along the conveyor belt 28. The intermediate section 24 is about eight feet (8') in length and includes two (2) idler pulleys 56 which are positioned at about four feet (4') apart from one another. In this way, by connecting multiple intermediate sections 24, each idler pulley 56 is generally spaced at about four feet (4') apart from one another, which is sufficient to support the load of the grain 12 upon the conveyor belt 28, except at the inlet duct 50 where the idler pulleys 56 include the three pulleys 56 within a total length of about six feet (6'), providing further support for the grain 12 as it is dropped or flows upon the conveyor belt 28.

Each idler pulley 56 in both the intermediate inlet section 22 and intermediate section 24 are secured within its respective housing, via adjustable bearing stiffness plates 60 having adjustment slots 62. The adjustment slots 62 enable the bearing stiffness plates 60 to be moved along. the longitudinal axis of the conveyor assembly 10 either fore or aft by about 0.75 inches, independently on either side of the idler pulley 56. In this way, the idler pulley 56 can be positioned substantially perpendicular to the conveyor belt 28 or angled a few degrees relative to this perpendicular position, which enables belt training capability for the conveyor belt 28. In other words, upon adjusting the bearing stiffness plates 60 either fore or aft on either side of the idler pulley 56, a tension and frictional force is applied to the conveyor belt 28 as it freely rolls along the idler pulley 56. This enables the conveyor belt 28 to be adjusted to the right or left of the longitudinal center line of the idler pulley 56 to substantially center the conveyor belt 28 along the entire conveyor assembly 10. This adjustment provides further versatility should it be required to form the conveyor assembly 10 along an arcuate curve versus along a straight axial path.

Figure 2:
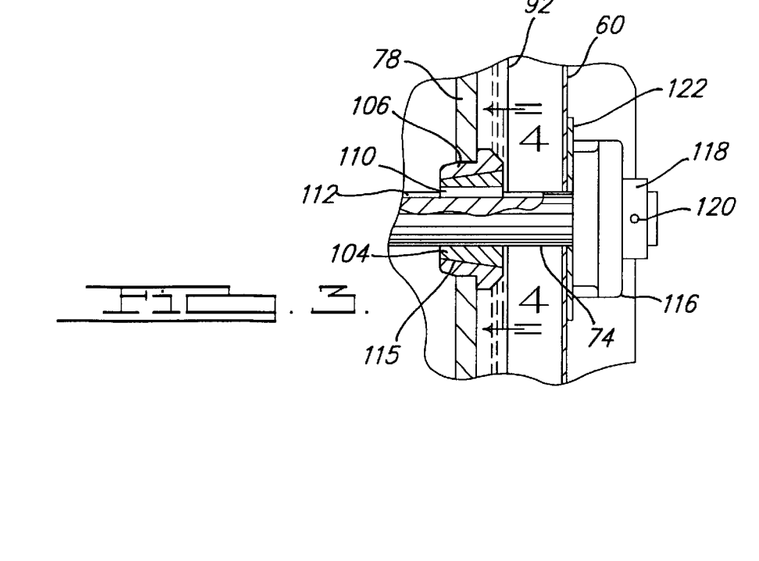
FIG. 2 is a side cross-sectional view of the grain conveyor assembly of FIG. 1 taken along line 2—2 in FIG. 1 showing an idler pulley according to the teachings of a first preferred embodiment of the present invention partially cut away.

Turning now to FIG. 2, a front lateral view of the idler pulley 56 is shown with a portion cut away for further detail. The idler pulley 56, shown in FIG. 2, is one of the idler pulleys 56 from the intermediate section 24. However, it should be understood that each idler pulley 56 in either the intermediate inlet section 22 or the intermediate section 24 will have the same type of idler pulley 56, as shown in detail in the following figures. The idler pulley 56 is positioned within the housing 58 of the intermediate section 24. The housing 58 includes a pair of adjustable bearing stiffness plates 60 positioned on either side of the idler pulley 56 and adjacent side panels 57, shown in FIG. 1. A lower housing plate 64 is coupled between the bearing stiffness plates 60 and side panels 57 which is adjacent to where the conveyor belt 28 generally rides underneath the idler pulleys 56. Positioned above the idler pulley 56 is an angled upper housing cover 66 which is angled at peak 68 to provide a cover over the grain 12 to inhibit the grain 12 from being exposed to the environment (i.e. rain, snow, wind, etc.).

The idler pulley 56 which is driven by and supports the conveyor belt 28 is preferably between about thirty inches (30") to about fifty-four inches (54") wide. The width may also be any other appropriate width depending on the particular application. The idler pulley 56 includes a hollow cylindrical central body portion 70 with a first angled or conically shaped portion 72 and a second angled or conically shaped portion 74. The central cylindrical portion 70 is formed by an elongated cylindrical tube 76 which extends substantially the entire length of the idler pulley 56. Located at each end of the cylindrical tube 76 are annular end disks 78 which are welded within the cylindrical tube 76 leaving a slight circular flange 80 to provide for clearance purposes of a hub and bushing assembly 102, further discussed herein.

Each conical portion 72 and 74 is formed by a conically shaped annular plate 84 and a flat annular end plate 86. The conical plate 84 preferably includes a cylindrical flange 88 which provides a cylindrical seat in which the flat annular end plate 86 is operable to be self centered within. Each plate 84 and 86 are preferably welded to the cylindrical body 76 or bolted thereto, further discussed herein. The cylindrical flange 88 eliminates any sharp corners or edges atop the idler pulley 56 to prevent the conveyor belt 28 from excessive wear or tearing should the conveyor belt 28 ride upon the cylindrical flange 88 of the conical portions 72 or 74. The flange 88 further provides an easy means of assembly for the flat annular end plate 86, as well as ensures a substantially concentric assembly to provide an overall balanced idler pulley 56. It should further be noted that the angled end portions 72 and 74 may have a parabolic or arcuate curve, as well as the conical shape. Moreover, the cylindrical body portion 70 and the angled end portions 72 and 74 may also be formed from a single integral piece of steel. It should further be noted that the components for the idler pulleys 56 are formed by metal spinning, thereby enhancing concentricity of the pulley 56.

The overall assembly of the idler pulley 56 thus provides a first outer end face 90 for the first angled end portion 72 and a second outer end face 92 for the second angled end portion 74 which supports and concentrates the weight or force upon a shaft 94 substantially adjacent the bearing plates 60, further discussed herein. The idler pulley 56 further includes a rotating planar surface 96 and opposed rotating angled surfaces 98 in which the conveyor belt 28 rides upon. The angled surfaces 98 are operable to enable the conveyor belt 28 to carry substantial amounts of grain 12 upon the surface of the conveyor belt 28 while preventing the grain from falling off the sides of the conveyor belt 28.

Figure 4:
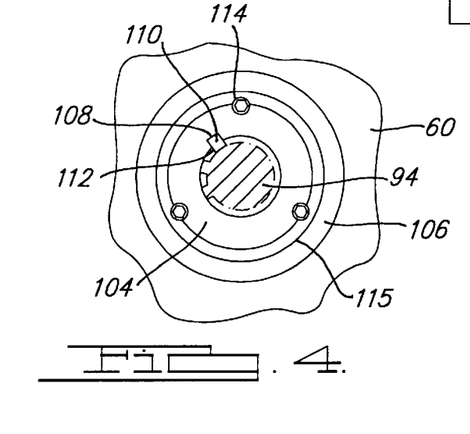
FIG. 4 is a cross-sectional view taken along line 4—4 of FIG. 3.
Figure 5:
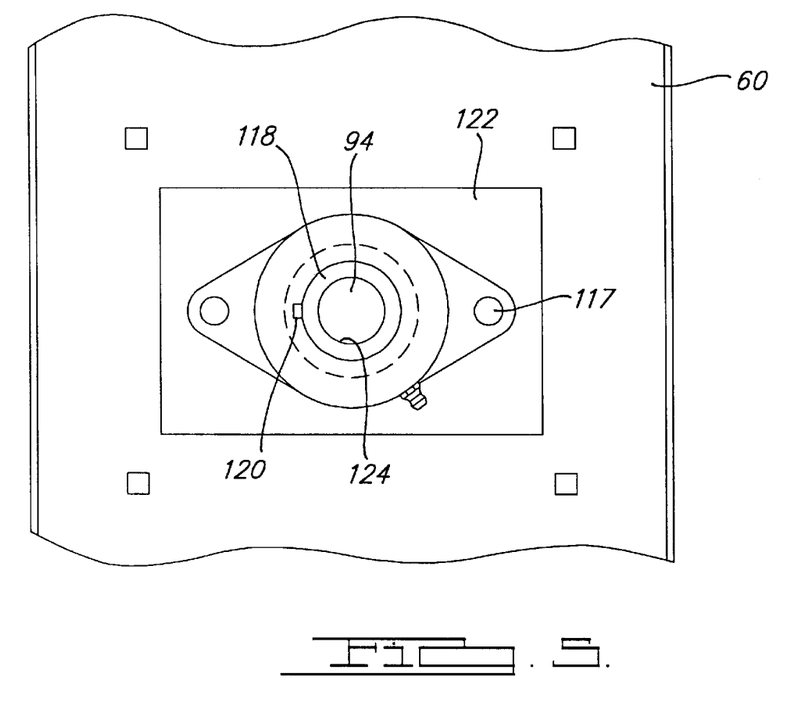
FIG. 5 is an enlarged side elevational view showing the bearing assembly and bearing seal plate of FIG. 2.

Referring now to the cut-away region in FIG. 2, as well as FIGS. 3–5, a positive balanced connection 100 between the idler pulley 56 and the shaft 94 is shown in detail with the understanding that each end of the idler pulley 56 includes the positive connection 100. This positive connection 100 is formed by the hub and bushing assembly 102. The hub and bushing assembly 102 includes a taper lock bushing 104 and a weld-on hub 106. The bushing 104 is preferably a DODGE taper lock bushing type JA or type SH and the hub 106 is preferably a DODGE taper lock weld-on hub, type JA-A or type SH-A or any other appropriate hub and bushing. The hub 106 is welded to the end disk 78 such that the hub 106 does not extend substantially beyond the end face 92. With the hub 106 welded to the end plate 78, the shaft 94 slidably receives the taper lock bushing 104 having a key way 108. The key way 108 receives a key 110 located within the key way 108 and a groove 112 formed within the shaft 94. Upon engaging the bushing 104 with the hub 106 at connection 100, multiple screws 114 are wedgely positioned between the bushing 104 and hub 106 to provide a frictional positive connection 100 between each end face 90 and 92 of the idler pulleys 56, via the opposed conical sidewall 115 of the hub and bushing assembly 102 and the shaft 94.

By using a hub and bushing assembly 102, this ensures substantial concentricity of the idler pulley 56 throughout its assembly, thereby providing a more balanced idler pulley 56 which reduces overall vibration throughout the system. Moreover, by positioning the hub and bushing assembly 102 or the positive connection 100 substantially adjacent to the bearing plate 60, the distance between the positive connection 100 and the bearing plate 60 is substantially reduced and is no more than about 1.75 inches, thereby substantially eliminating shaft deflection for the shaft 94 and any internal shaft stresses caused by such deflection. In other words, shaft deflection is reduced by about sixty percent (60%) and stress on this shaft is reduced by about fifty percent (50%) as compared to the RGF idler pulley. Still further, such a connection 100 enables the shaft 94 to be readily removed and replaced or repaired relative to the idler pulley 56, as well as eliminates a weld at this connection point which may induce further stresses in this area.

Each end of the shaft 94, which may include two separate shafts, rides upon an idler bearing assembly 116 which is preferably a Browning Valuline Flange Block bearing unit (part no. VF28-120) or other appropriate bearing assembly. The bearing assembly 116 is bolted to the bearing plate 60, via bolts 117, such that the shaft 94 rides upon the bearing assembly 116. The cold-rolled shaft 94 is retained between the bearing plates 60 and upon the pair of bearing assemblies 116, via a pair of bearing collars 118 which are fixedly secured to the shaft 94, via a set screw 120. Accordingly, the shaft 94 rotates within the bearings 116 and is fixedly secured to the idler pulley 56, via the positive connection 100 utilizing the hub and bushing assembly 102.

Positioned between the bearing assembly 116 and the bearing plate 60 is a rectangularly shaped bearing seal plate 122 formed from ultra high molecular weight polyethylene. The bearing seal plate 122 defines a bore 124 which is operable to slidably receive the shaft 94. The polymer seal 122 provides a plastic liner or seal to prevent dust and dirt from accumulating within the bearing assembly 116, thereby reducing friction and wear for the bearing assembly 116. In addition, should the bearing assembly 116 ever fail or heat up due to frictional forces, the polymer seal 122 further provides a means of dissipating heat between the shaft 94 and the bearing assembly 116, thereby reducing the possibility of generating a flash point in this area.

Figure 6:
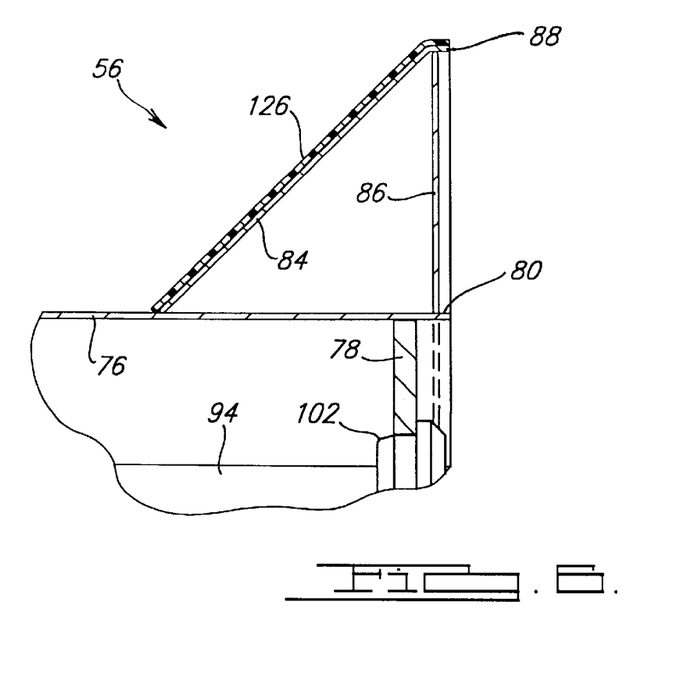
FIG. 6 is an enlarged partial cross-sectional view of the idler pulley of FIG. 2 according to the teachings of a second preferred embodiment of the present invention.

Turning now to FIG. 6, a second preferred embodiment of the idler pulley 56 is shown. In this regard, like reference numerals will be used to identify like structures. The idler pulley 56, shown in FIG. 6, is substantially similar to the idler pulley 56, shown in FIG. 2, except that the conical surface 98 about the conical portions 72 and 74 include an ultra high molecular weight polyethylene liner 126. This liner 126 may be configured as a separate replaceable part relative to the conical portions 72 and 74. Alternatively, the liner 126 may be permanently secured to each of the conical portions 72 and 74 with the entire conical portions 72 and 74 being a removable and replaceable assembly that is bolted to the cylindrical tube 76. The polymer liner 126 is used to substantially reduce friction and heat buildup along the angled surfaces 98 due to the velocity difference between the cylindrical portion 70 versus the conical portions 72 and 74. In other words, as you travel farther outbound from the center rotating axis along the conical surface 98, the velocity of rotation in these areas increase. Thus, since the idler pulley 56 is formed to be a single rotating member about which the conveyor belt 28 rides, this constraint between the conveyor belt 28 and the idler pulley 56 generates additional friction along the angled or conical surfaces 98, thereby increasing the wear on the conveyor belt 28. By inserting the polymer liner 126 on both conical portions 72 and 74 with the central portion 70 being primarily a metal surface, friction and heat is substantially dissipated and reduced along the conical portions 72 and 74, thereby increasing the overall life of the conveyor belt 28.

Figure 7:
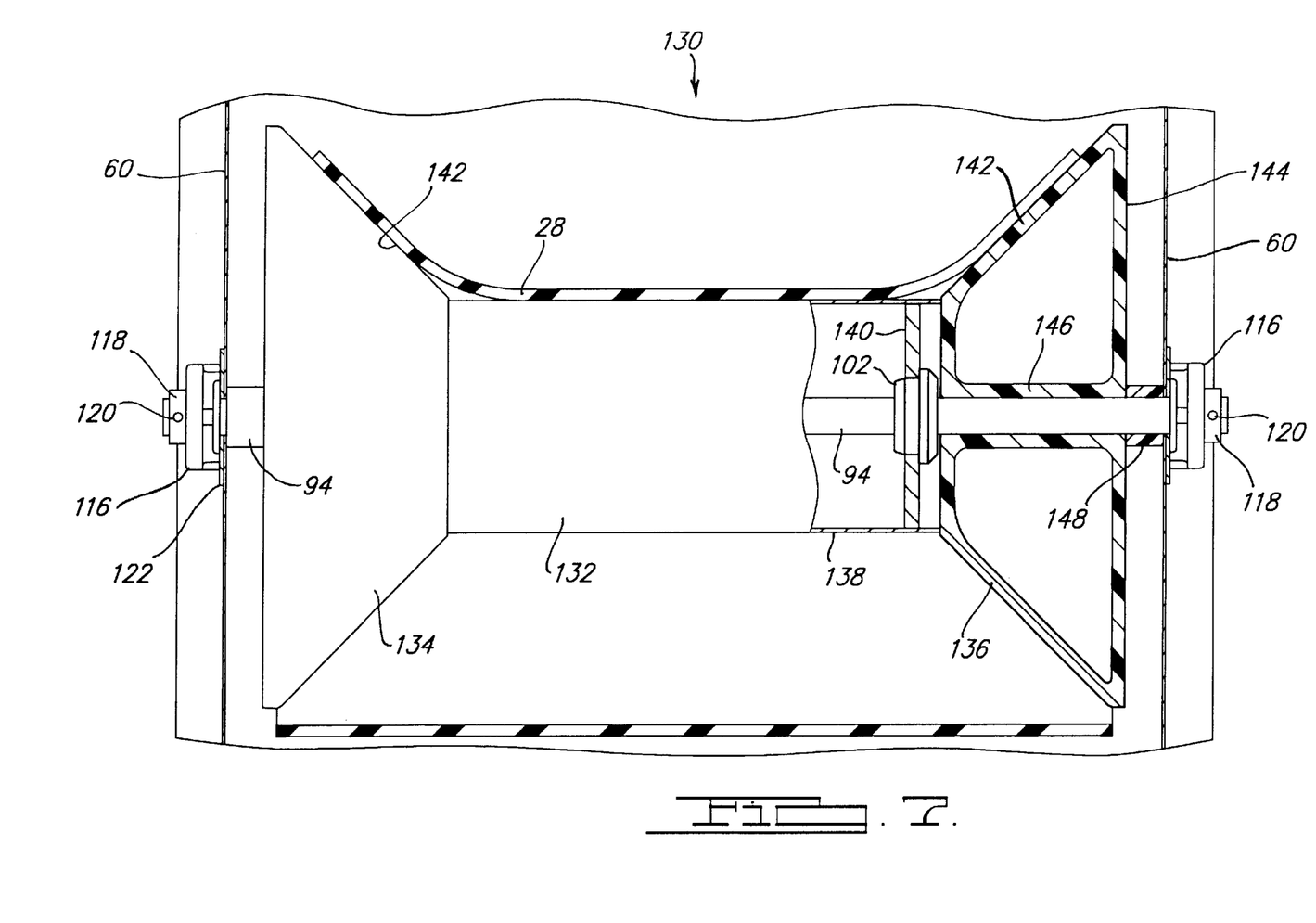
FIG. 7 is a side cross-sectional view of the grain conveyor assembly of FIG. 1 taken along line 2—2 in FIG. 1 showing an idler pulley according to the teachings of a third preferred embodiment of the present invention partially cut away.

Turning now to FIG. 7, a third preferred embodiment of an idler pulley 130 is shown. In this regard, like reference numerals will be used to identify like structures. The idler pulley 130 includes an independently rotating cylindrical portion 132 and independently rotating conical portions 134 and 136. The cylindrical portion 132 is formed by a cylindrical tube 138 having annular welded end plates 140 which are operable to receive the hub and bushing assembly 102 to secure the cylindrical portion 132 to the shaft 94. Each conical section 134 and 136 may be either formed from metal or ultra high molecular weight polyethylene to reduce heat and friction as discussed above. Alternatively, each section 134 and 136 may be formed of a combination of a metal conical portion formed with a polymer liner, as set forth in FIG. 6 or entirely from metal, as shown in FIG. 2. Each conical portion 134 and 136 in FIG. 7 is shown formed of an ultra high molecular weight polyethylene and includes an outer conical surface 142, and a closed annular portion 144, each of which are secured relative to a cylindrical sleeve 146. An additional sleeve 148 is provided between the conical portions 134 and 136 and the bearing plates 60 to retain the conical portions 134 and 136 adjacent the central portion 132. In this way, each conical portion 134 and 136 may independently rotate about the shaft 94, via the sleeve 146. This enables each conical portion 134 and 136 along with the central portion 132 to rotate at different speeds independently, thereby reducing the friction between the conveyor belt 28 and the pulley 130 which further reduces the overall wear of the conveyor belt 28 and reduces any heat which may be generated due to the friction.

Use of the above-identified idler pulley 56 reduces overall shaft deflection, as well as internal stresses within the shaft, thereby providing a more reliable idler pulley 56. The shaft stresses and deflection are substantially reduced by positioning the hub and bushing assembly 102 substantially outbound to the outer end faces 90 and 92 of the idler pulley 56 and substantially adjacent to the bearing plates 60, thereby reducing the moment arm. Furthermore, by utilizing the hub and bushing assembly 102, a positive balanced connection 100 between the shaft 94 and the idler pulley 56 is achieved which is substantially concentric, thereby reducing vibration and providing an overall balanced system. Moreover, such a connection 100 provides the versatility for removing and repairing the shaft 94 and eliminates any welding along the shaft 94 which may further create stresses in these areas. In addition, by providing the end plates 86 in the conical portions 72 and 74, these areas are substantially sealed from debris or dust, as well as substantially eliminating any wind or turbulence that could be created from open spokes, thereby maintaining and keeping grain dust down along the conveyor assembly 10. Still further, providing a concentration of idler pulleys 56 at the inlet to the conveyor assembly 10 further spreads the force or disburses this force over a larger area, providing a more reliable system. Finally, by providing independently rotating members or a polymer liner, heat is dissipated easier and less friction is caused between the conveyor belt 28 and the idler pulley 56, thereby further reducing wear of the conveyor belt 28.

The foregoing discussion discloses and describes merely exemplary embodiments of the present invention. One skilled in the art will readily recognize from such discussion, and from the accompanying drawings and claims, that various changes, modifications and variations can be made therein without departing from the spirit and scope of the invention as defined in the following claims.

What is claimed is:

1. An idler pulley for use in supporting a conveyor belt in a conveyor assembly, said idler pulley comprising:
    a central body portion;
    a first angled end portion extending from said central body portion, said first angled end portion having a first outer end face;
    a second angled end portion extending from said central body portion, said second angled end portion having a second outer end face;
    a shaft rotatably supported at a first location and extending into said first angled end portion; and
    a first positive balanced connection between said first outer end face and said shaft, said first positive balanced connection including a hub and bushing assembly having a hub secured to said first outer end face and a taper lock bushing positioned about said shaft, wherein said first positive balanced connection is formed by opposed conical sidewalls of said hub and said taper lock bushing, whereby said shaft is fixedly secured to said idler pulley at said first outer end face and said first positive balanced connection is substantially adjacent to said first location to substantially reduce shaft deflection and provide a substantially balanced connection.

2. The idler pulley as defined in claim 1 wherein said bushing is fixedly secured to said shaft with a key passing through a key way.

3. The idler pulley as defined in claim 1 wherein said first location includes a bearing assembly upon which said shaft rotates.

4. The idler pulley as defined in claim 3 wherein a polymer bearing seal liner is positioned adjacent said bearing assembly.

5. The idler pulley as defined in claim 1 wherein the distance between said first positive balanced connection and said first location is no more than about 1.75 inches.

6. The idler pulley as defined in claim 1 wherein said first outer end face substantially seals said first angled end portion to reduce an accumulation of debris in said first angled end portion and substantially eliminates any air turbulence which may be caused upon rotation of said first angled end portion.

7. The idler pulley as defined in claim 1 wherein said shaft extends through said first angled end portion, said central body portion and said second angled end portion, and said central body portion is cylindrically shaped, said first angled end portion is conically shaped, and said second angled end portion is conically shaped.

8. A conveyor assembly for transporting granular material from a first location to a second location, said conveyor assembly comprising:
    a head section having a head pulley operable to drive a conveyor belt along the conveyor assembly;
    a tail section having a tail pulley upon which said conveyor belt rides;
    an intermediate inlet section having an inlet duct and at least three idler pulleys located along said inlet duct, said three idler pulleys are operable to substantially dissipate a force generated by the granular material flowing upon said conveyor belt;
    at least one of said idler pulleys including,
        a central body portion;
        a first angled end portion extending from said central body portion, said first angled end portion having a first outer end face;
        a second angled end portion extending from said central body portion, said second angled end portion having a second outer end face;
        a bearing plate adjacent said first angled end portion;
        a bearing assembly secured to said bearing plate;
        a polymer bearing seal liner positioned between said bearing plate and said bearing assembly:
        a shaft rotatably supported at said bearing plate and extending into said first angled end portion; and
        a first positive balanced connection between said first outer end face and said shaft, said first positive balanced connection including a hub and bushing assembly positioned at said first outer end face, wherein said shaft is fixedly secured to said idler pulley at said first outer end face and said first positive balanced connection is substantially adjacent to said bearing plate to substantially reduce shaft deflection and provide a substantially balanced connection.

9. The conveyor assembly as defined in claim 8 wherein said first outer end face substantially seals said first angled end portion to reduce an accumulation of debris in said first angled end portion and substantially eliminates any air turbulence which may be caused upon rotation of said first angled end portion.

* * * * *

UNITED STATES PATENT AND TRADEMARK OFFICE
CERTIFICATE OF CORRECTION

PATENT NO.     : 6,273,244 B1
DATED          : August 14, 2001
INVENTOR(S)    : Dingeldein et al.

It is certified that error appears in the above-identified patent and that said Letters Patent is hereby corrected as shown below:

Title page,
Item [56], References Cited, FOREIGN PATENT DOCUMENTS,
Documents Nos: 4,146,947 and 710,936 should be listed as U.S. PATENT DOCUMENTS, not "FOREIGN":
-- 4,146,947   4/1979   Richter
   710,936    10/1902   Bacon --.

Column 2,
Line 28, "addition" should be -- additional --.

Column 4,
Line 56, "(6"-3")" should be -- (6'-3") --.

Column 6,
Line 1, "along." should be -- along -- (no period).

Column 10,
Line 47, "assembly:" should be -- assembly; --.

Signed and Sealed this

Eighth Day of October, 2002

*Attest:*

JAMES E. ROGAN
*Attesting Officer*   *Director of the United States Patent and Trademark Office*